United States Patent
Griffin et al.

(10) Patent No.: US 10,520,524 B1
(45) Date of Patent: Dec. 31, 2019

(54) SYSTEM AND METHOD FOR DISTRIBUTED AIRFLOW SENSING

(71) Applicant: Aurora Flight Sciences Corporation, Manassas, VA (US)

(72) Inventors: Riley Griffin, Manassas, VA (US); Michael Lieu, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 170 days.

(21) Appl. No.: 15/887,075

(22) Filed: Feb. 2, 2018

Related U.S. Application Data

(60) Provisional application No. 62/454,188, filed on Feb. 3, 2017.

(51) Int. Cl.
*G01P 5/14* (2006.01)
*G01P 13/02* (2006.01)
*G01P 5/16* (2006.01)
*G01P 5/165* (2006.01)

(52) U.S. Cl.
CPC .................. *G01P 5/14* (2013.01); *G01P 5/16* (2013.01); *G01P 5/165* (2013.01); *G01P 13/025* (2013.01)

(58) Field of Classification Search
CPC .......... G01P 13/025; G01P 5/165; G01P 5/14; G01P 5/16
See application file for complete search history.

(56) References Cited

U.S. PATENT DOCUMENTS

| | | | |
|---|---|---|---|
| 3,006,187 A * | 10/1961 | Wilkenson | ............. B64D 43/02 73/180 |
| 3,327,529 A * | 6/1967 | Bowles | ................... F15C 1/006 73/180 |
| 4,350,314 A | 9/1982 | Hoadley | |
| 5,082,207 A | 1/1992 | Tulinius | |
| 5,796,612 A * | 8/1998 | Palmer | .................. B64D 15/20 701/4 |

(Continued)

FOREIGN PATENT DOCUMENTS

| | | | |
|---|---|---|---|
| EP | 2950071 | 2/2015 | |
| RU | 2187821 | * 8/2002 | ............... G01P 5/14 |

OTHER PUBLICATIONS

International Search Report; and Written Opinion of the International Searching Authority for International Application No. PCT/US2018/016631 dated Sep. 14, 2018.

(Continued)

*Primary Examiner* — Daniel S Larkin
*Assistant Examiner* — Anthony W Megna Fuentes
(74) *Attorney, Agent, or Firm* — Michael Stanley Tomsa; McAndrews, Held & Malloy, Ltd.; Eugene H. Nahm

(57) ABSTRACT

Disclosed herein is a distributed pressure sensor system that quickly detects and counters changes in lift, onset of stall, and flutter. The distributed pressure sensor system may employ a plurality of integrated pressure ports distributed across the span of a wing's leading edge to gather differential pressure measurements. Based on the differential pressure measurements, the distributed pressure sensor system can estimate torque on the fuselage to provide a more efficient estimate for changes in lift, onset of stall, and/or flutter. These estimates may be applied as feedback to the aircraft's control system, thereby eliminating the latency in the existing platform dynamics.

20 Claims, 9 Drawing Sheets

(56) References Cited

U.S. PATENT DOCUMENTS

| | | | |
|---|---|---|---|
| 6,002,972 | A | 12/1999 | Palmer |
| 6,253,126 | B1 | 6/2001 | Palmer |
| 6,271,769 | B1 * | 8/2001 | Frantz ................... G01P 13/025 340/963 |
| 7,114,387 | B2 | 10/2006 | Omotani |
| 2010/0258678 | A1 * | 10/2010 | Fermor ................. B64D 43/02 244/196 |
| 2010/0266405 | A1 * | 10/2010 | Mayda ................... G01M 9/06 416/61 |
| 2012/0248256 | A1 | 10/2012 | Mayda |
| 2016/0200420 | A1 | 7/2016 | Mckenna |

OTHER PUBLICATIONS

Mohamed, A. et al. "Bioinspired Wing-Surface Pressure Sensing for Attitude Control of Micro Air Vehicles." Journal of Aircraft, 52(3). Jun. 2015.

\* cited by examiner

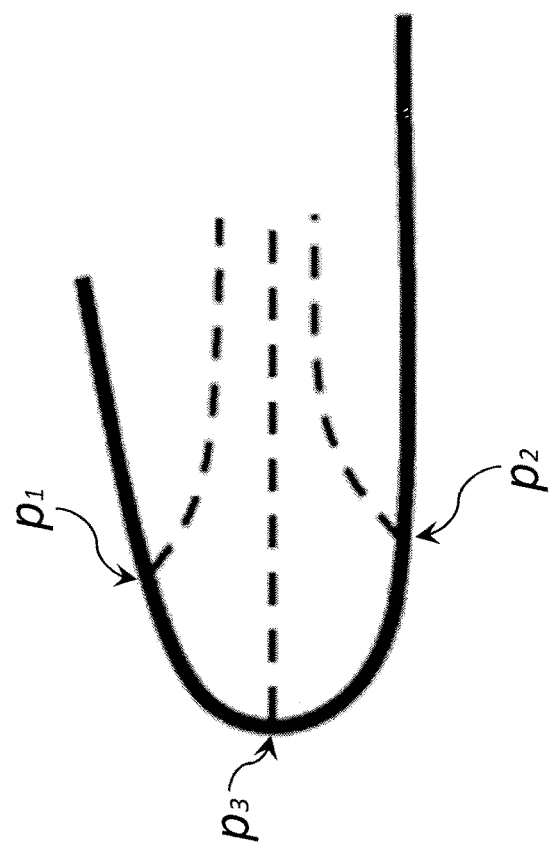

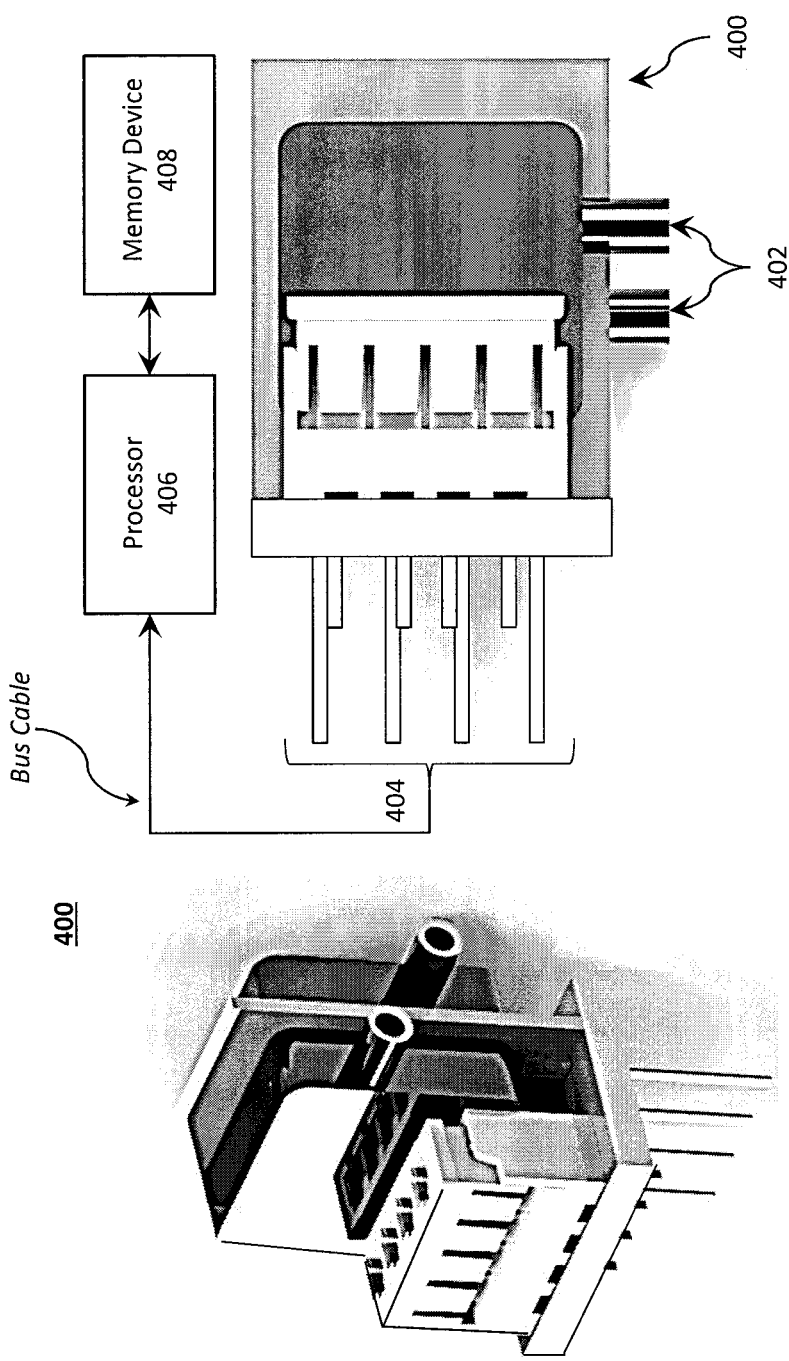

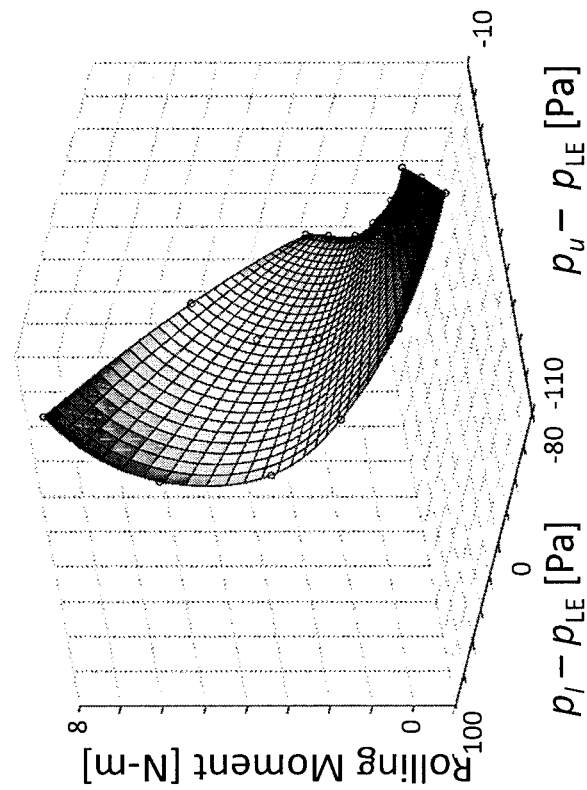
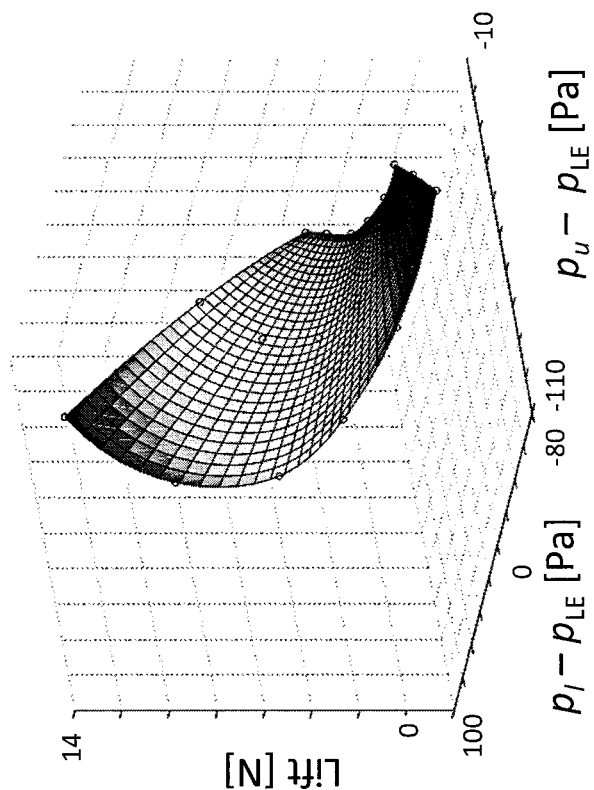
Figure 8a
Figure 8b

SYSTEM AND METHOD FOR DISTRIBUTED AIRFLOW SENSING

CROSS-REFERENCE TO RELATED APPLICATION

The present application claims the benefit under 35 U.S.C. § 119(e) of U.S. Provisional Patent Application Ser. No. 62/454,188, filed Feb. 3, 2017 and titled "System and Method for Distributed Airflow Sensing," the contents of which are hereby incorporated by reference

STATEMENT OF GOVERNMENT INTEREST

This invention was made with government support under Contract Number: W911QX-13-C-0001 awarded by the U.S. Army Research Laboratory (ARL). The government has certain rights in the invention.

FIELD

The present disclosure relates to the field of vehicle navigation in a fixed wing aircraft, and, more specifically, to techniques for providing gust rejection and increasing vehicle stability using distributed airflow sensing on fixed wing aircraft.

BACKGROUND

As flight vehicle capabilities are expanded to more complex missions and dynamic environments, the ability to actively sense undesirable aerodynamic forces acting on the vehicle and generate feedback strategies to mitigate these disturbances greatly improves robustness. That is, unmanned aerial vehicles (UAVs), small-unmanned aerial systems (sUAS), and other small aircraft, particularly those intended for use in urban or otherwise cluttered environments, face extreme constraints with regard to stability of the aircraft's state (e.g., attitude and position) when faced with atmospheric turbulence and gusts.

In particular, high winds, cluttered urban environments, and proximity to other vehicles can introduce disturbances that are often difficult to reject with existing flight control technologies. Indeed, when navigating urban canyons, a one to two meter offset in course could lead to obstacle collision, mission failure, or vehicle loss. Gust rejection and vehicle stability is particularly crucial for generating clear and comprehensible surveillance video, a primary duty of these small aircraft. Assymetric gusts, flutter, and near-stall flight are all examples of disturbances that could be effectively rejected with on-wing sensing that estimates airflow characteristics and aeroelastic effects on the airframe. For example, UAVs are often subjected to asymmetric gusts caused by the channeling and occlusions of flow in urban canyons—flow fields unique to this environment.

While traditional inertial navigation systems (INS) are effective for vehicle stabilization, they incur an inherent lag in attitude correction, as errors must be measured before they are corrected. Further, while effective, some previously investigated proprioceptive sensing methods that use strain and pressure-based measurements require relatively complicated structural and aerodynamic modeling. For example, commonly owned U.S. Patent Publication No. 2016/0200420 to McKenna et al. titled System and Method for Unwanted Force Rejection and Vehicle Stability discloses techniques for providing gust rejection and increasing vehicle stability via proprioceptive sensing techniques using strain gauge embedded within the wings.

As flight vehicle capabilities are expanded to more complex missions and dynamic environments, new sensor regimes may be employed to improve robustness, survivability, and mission effectiveness. For example, the ability to sense dynamically disturbance forces and moments acting on the vehicle and the ability to use these sensed quantities in feedback strategies to mitigate disturbances. In fact, these capabilities may be combined with many discretized flaps on the vehicle wing to enable localized, high-resolution disturbance sensing and rejection. Consequently, small aircraft, such as UAVs and sUAS, would greatly benefit from gust rejection through increased maneuverability, expanded flight envelopes, and improved performance.

Accordingly, a need exists for a system and method to quickly detect and counter changes in lift, onset of stall, and flutter, which, as disclosed herein, may be achieved using a distributed pressure sensor system.

SUMMARY

The present disclosure is directed to a distributed pressure sensor system to quickly detect and counter changes in lift, onset of stall, and flutter. The distributed pressure sensor system may employ a plurality of integrated pressure ports distributed across the span of a wing's leading edge to provide efficient estimates for changes in lift, onset of stall, and flutter.

According to a first aspect, a distributed pressure sensor system for an aerial vehicle comprises: a first wing and a second wing, each of said first wing and said second wing having an upper surface, a lower surface, a leading edge, and a trailing edge; a first plurality of pressure sensor modules distributed along the leading edge of the first wing, and a second plurality of pressure sensor modules distributed along the leading edge of the second wing, wherein each of said first and second plurality of pressure sensor modules comprises an upper surface pressure-sensing port, a lower surface pressure-sensing port, a leading edge pressure-sensing port, a first differential pressure transducer, and a second differential pressure transducer, wherein the upper surface pressure-sensing port is positioned on the upper surface adjacent the leading edge, wherein the leading surface pressure-sensing port is positioned at the leading edge, wherein the lower surface pressure-sensing port is positioned on the lower surface adjacent the leading edge, wherein the first differential pressure transducer is fluidly coupled to each of the upper surface pressure-sensing port and leading surface pressure-sensing port to determine a differential pressure between the upper and leading surface, and wherein the second differential pressure transducer is fluidly coupled to each of the lower surface pressure-sensing port and leading surface pressure-sensing port to determine a differential pressure between the lower and leading surface; and a processor operably coupled with the first differential pressure transducer and the second differential pressure transducer are operatively coupled with the processor.

In certain aspects, the first and second wings are fabricated substantially from a composite material.

In certain aspects, the first differential pressure transducer and the second differential pressure transducer are operatively coupled with the processor via an Inter Integrated Circuit (I2C) bus cable.

In certain aspects, a cabling channel runs lengthwise adjacent the leading edge of said first wing and said second wing.

In certain aspects, the I2C bus cable is positioned within said cabling channel.

In certain aspects, the I2C bus cable has conductors oriented by |Clk|Gnd|Power|Data| to reduce the crosstalk between clock and data.

In certain aspects, each of said plurality of pressure sensor modules includes a pressure sensor rib structure.

In certain aspects, the outer profile of the pressure sensor rib structure is sized and shaped to match the profile of at least a portion of the leading edge.

In certain aspects, the pressure sensor rib structure defines an upper surface conduit, a lower surface conduit, and a leading surface conduit.

In certain aspects, the first differential pressure transducer is fluidly coupled (1) to the upper surface pressure-sensing port via the upper surface conduit and (2) to the leading surface pressure-sensing port via the leading surface conduit, and wherein the second differential pressure transducer is fluidly coupled (1) to the lower surface pressure-sensing port via the lower surface conduit and (2) to the leading surface pressure-sensing port via the leading surface conduit.

In certain aspects, the pressure sensor rib structure defines a differential pressure transducer cavity to house the first differential pressure transducer and the second differential pressure transducer.

In certain aspects, the processor is configured to calculate lift on each of the first and second wings based on (1) the differential pressure between the lower and leading surface and (2) the differential pressure between the upper and leading surface.

In certain aspects, the processor is further configured to calculate roll torque based on (1) the lift on the first wing and (2) the lift on the second wing.

In certain aspects, the processor is operably coupled with an autopilot.

In certain aspects, the processor is configured to instruct the autopilot based at least in part on the calculated roll torque.

In certain aspects, each of said plurality of pressure sensor modules is removably coupled with either the first wing or the second wing.

In certain aspects, the first differential pressure transducer and the second differential pressure transducer removably coupled with the I2C bus cable.

In certain aspects, each of said first and second first plurality of pressure sensor modules includes at least six pressure sensor modules.

In certain aspects, each of the lower surface pressure-sensing port, the upper surface pressure-sensing port, and the leading surface pressure-sensing port is formed in the leading edge of the first wing or the second wing as part of an additive manufacturing process.

According to a second aspect, a method for determining roll torque of an aircraft using a distributed pressure sensor system having a plurality of pressure sensor modules distributed along the leading edge of a wing comprises: measuring, via a first differential pressure transducer at a first pressure sensor module, a first differential pressure between an upper surface of a first wing and a leading edge of the first wing, wherein the first differential pressure is determined via a first upper surface pressure-sensing port and a first leading edge pressure-sensing port positioned on the first wing; measuring, via a second differential pressure transducer at the first pressure sensor module, a second differential pressure between a lower surface of the first wing and the leading edge of the first wing, wherein the second differential pressure is determined via a first lower surface pressure-sensing port and the first leading edge pressure-sensing port positioned on the first wing; determining lift, via the processor, on said first wing using said first differential pressure and said second differential pressure; measuring, via a third differential pressure transducer at a second pressure sensor module, a third differential pressure between an upper surface of a second wing and a leading edge of the second wing, wherein the third differential pressure is determined via a second upper surface pressure-sensing port and a second leading edge pressure-sensing port positioned on the second wing, the first wing and the second wing being positioned on opposite sides the aircraft's center of gravity; measuring, via a fourth differential pressure transducer at the second pressure sensor module, a fourth differential pressure between a lower surface of the second wing and the leading edge of the second wing, wherein the fourth differential pressure is determined via a second lower surface pressure-sensing port and the second leading edge pressure-sensing port positioned on the second wing; determining, via the processor, lift on said second wing using said third differential pressure and said fourth differential pressure; and calculating, via the processor, roll torque of the aircraft as a function of the different between the lift on said first wing and the lift on said second wing.

In certain aspects, the method further comprises the step of calibrating the first, second, third, and fourth differential pressures using a reference dataset to determine an estimation of changes in aerodynamic forces at each of said plurality of pressure sensor modules along the leading edge of the wing.

In certain aspects, the reference dataset includes wind tunnel data or flight test data.

In certain aspects, each of said plurality of pressure sensor modules is positioned along the leading edge of the wing at a predetermined position to enable estimation of total forces and moments acting on the aircraft.

According to a third aspect, a distributed pressure sensor system for an aerial vehicle comprises: a first wing and a second wing, each of said first wing and said second wing having an upper surface, a lower surface, a leading edge, and a trailing edge; a first plurality of pressure sensor modules distributed along the leading edge of the first wing, and a second plurality of pressure sensor modules distributed along the leading edge of the second wing, wherein each of said first and second plurality of pressure sensor modules comprises an upper surface pressure-sensing port, a lower surface pressure-sensing port, a leading edge pressure-sensing port, a first differential pressure transducer, and a second differential pressure transducer, wherein the upper surface pressure-sensing port is positioned on the upper surface adjacent the leading edge, wherein the leading surface pressure-sensing port is positioned at the leading edge, wherein the lower surface pressure-sensing port is positioned on the lower surface adjacent the leading edge, wherein the first differential pressure transducer is fluidly coupled to two of said upper surface pressure-sensing port, said lower surface pressure-sensing port, and said leading surface pressure-sensing port to determine a first differential pressure, and wherein the second differential pressure transducer is fluidly coupled to two of said upper surface pressure-sensing port, said lower surface pressure-sensing port, and said leading surface pressure-sensing port to determine a second differential pressure that is different from said first differential pressure; and a processor operably coupled with the first differential pressure transducer and the second differential pressure transducer are operatively coupled with the processor.

In certain aspects, the first differential pressure transducer is fluidly coupled (1) to the upper surface pressure-sensing port via the upper surface conduit and (2) to the leading surface pressure-sensing port via the leading surface conduit, and wherein the second differential pressure transducer is fluidly coupled (1) to the lower surface pressure-sensing port via the lower surface conduit and (2) to the leading surface pressure-sensing port via the leading surface conduit.

In certain aspects, the first differential pressure transducer is fluidly coupled (1) to the upper surface pressure-sensing port via the upper surface conduit and (2) to the leading surface pressure-sensing port via the leading surface conduit, and wherein the second differential pressure transducer is fluidly coupled (1) to the lower surface pressure-sensing port via the lower surface conduit and (2) to the upper surface pressure-sensing port via the upper surface conduit.

DESCRIPTION OF THE DRAWINGS

These and other advantages of the present disclosure can be readily understood with the reference to the following specifications and attached drawings wherein:

FIG. 2 depicts a cross-section of a leading edge of an example airfoil.

FIGS. 4a and 4b illustrate an example differential pressure transducer suitable for use in a distributed pressure sensor system.

FIGS. 8a and 8b illustrate, respectively, example lift and rolling moment mapping to the lower and upper surface pressure from the steady state wing characterization.

DETAILED DESCRIPTION

Figure 1:
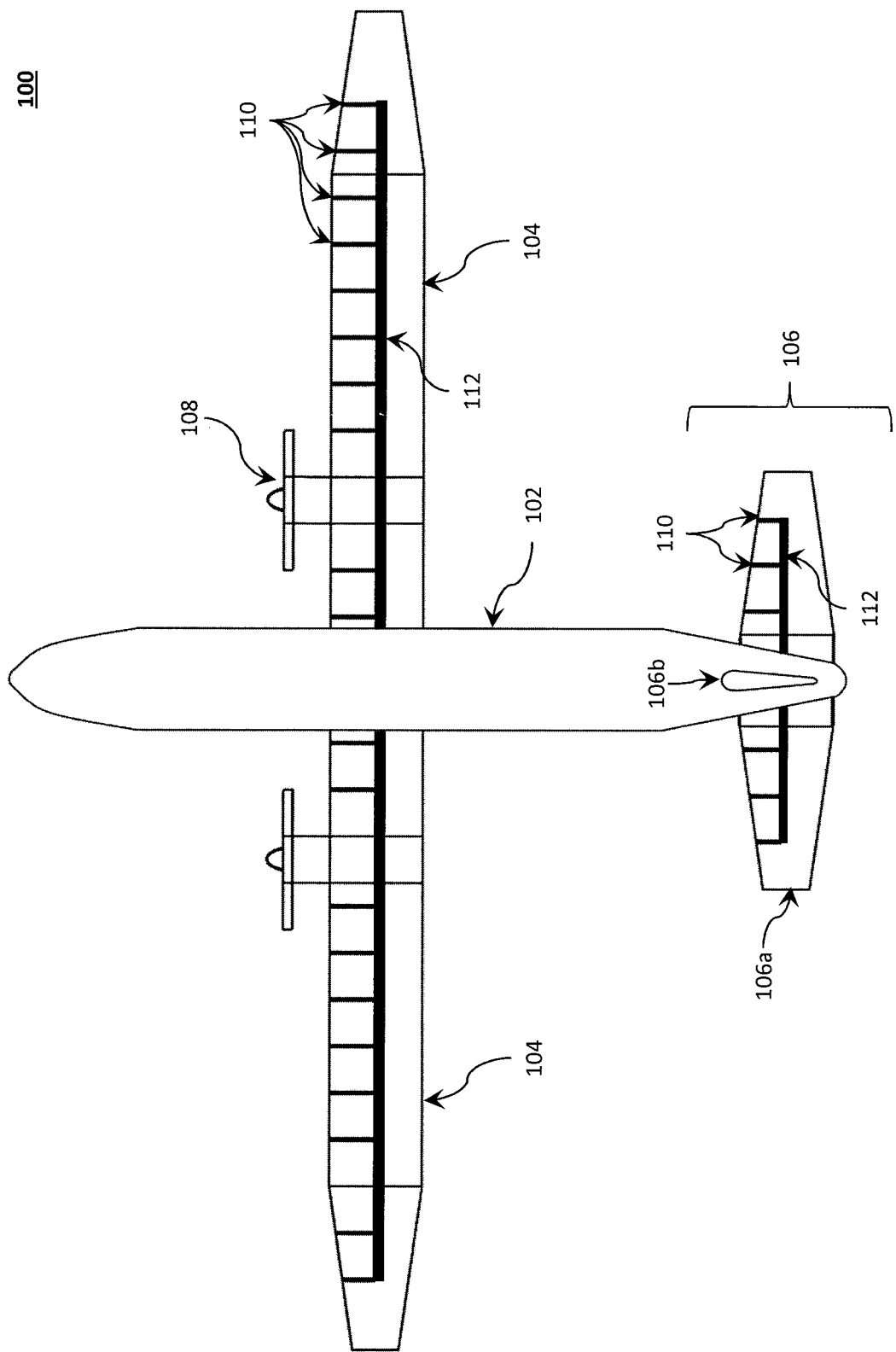
FIG. 1 depicts a top plan view of an example fixed wing sUAS with an example distributed pressure sensor system.

Preferred embodiments of the present disclosure are described hereinbelow with reference to the accompanying drawings. In the following description, well-known functions or constructions are not described in detail because they may obscure the disclosure in unnecessary detail. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within the range, unless otherwise indicated herein, and each separate value within such a range is incorporated into the specification as if it were individually recited herein. For this disclosure, the following terms and definitions shall apply.

The terms "about" and "approximately," when used to modify or describe a value (or range of values), mean reasonably close to that value or range of values. Thus, the embodiments described herein are not limited to only the recited values and ranges of values, but rather should include reasonably workable deviations The terms "aerial vehicle" and "aircraft" refer to a machine capable of flight, including, but not limited to, fixed wing aircraft, unmanned aerial vehicle, variable wing aircraft, and vertical take-off and landing (VTOL) aircraft.

The terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination.

The term "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y, and z."

The terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code.

The term "composite material" as used herein, refers to a material comprising an additive material and a matrix material. For example, a composite material may comprise a fibrous additive material (e.g., fiberglass, glass fiber ("GF"), carbon fiber ("CF"), aramid/para aramid synthetic fibers, etc.) and a matrix material (e.g., epoxies, polyimides, and alumina, including, without limitation, thermoplastic, polyester resin, polycarbonate thermoplastic, casting resin, polymer resin, acrylic, chemical resin). In certain aspects, the composite material may employ a metal, such as aluminum and titanium, to produce fiber metal laminate (FML) and glass laminate aluminum reinforced epoxy (GLARE). Further, composite materials may include hybrid composite materials, which are achieved via the addition of some complementary materials (e.g., two or more fiber materials) to the basic fiber/epoxy matrix.

The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list, or data presented in any other form.

The term "exemplary" means serving as a non-limiting example, instance, or illustration. Similarly, as utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

The term "memory device" means computer hardware or circuitry to store information for use by a processor. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The present disclosure is directed to a distributed pressure sensor system to quickly detect and counter changes in lift, onset of stall, and flutter. The distributed pressure sensor system may employ a plurality of integrated pressure ports distributed across the span of a wing's leading edge to gather differential pressure measurements. Based on the differential pressure measurements, the distributed pressure sensor system can estimate torque on a given body (e.g., a fuselage) to provide a more efficient estimate for changes in lift, onset of stall, and/or flutter. These estimates may be applied as feedback to the aircraft's control system, thereby eliminating the latency in the existing platform dynamics. Feedback of differential pressure measurements may be taken to replace, or supplement, existing roll torque estimation techniques for disturbance rejection on sUAS. For example, pressure data collected adjacent the surface (e.g., at leading edge) of the wing's airfoil may be recorded and used to calculate differential pressure across two points on the wing's airfoil surface.

As illustrated in FIG. 1, an example fixed wing sUAS 100 having a distributed pressure sensor system generally comprises a fuselage 102, two wings 104 (together defining a wing set), one or more propulsors 108, and an empennage 106. The left and right wings 104 are positioned on opposite sides of the fuselage 102 or, in other words, on opposite sides of the aircraft's center of gravity, thereby providing balance to the aircraft during forward flight. The empennage 106 generally comprises two parts, the horizontal stabilizer 106a, and a single vertical stabilizer 106b (or a set of substantially vertical stabilizers 106b). The size and location of the propulsors 108 may be optimized for a particular need (e.g., aircraft size and/or operational requirement). The fixed wing sUAS 100 may further include landing gear (e.g., nose-end landing gear and main landing gear) and payload.

The wings 104 and/or horizontal stabilizer 106a may be used to facilitate the distributed pressure-sensing system via a distributed array of pressure sensors. To that end, the leading edge of each of the wings 104 and/or horizontal stabilizer 106a may include a plurality of pressure sensor modules 110. In one embodiment, the plurality of pressure sensor modules 110 may be integrated with the wings 104. In another embodiment, each of the plurality of pressure sensor modules 110 may be a stand-alone unit, which can be installed on the wings 104. The pressure sensor modules 110 may be placed at distributed span-wise positions along the leading edge of the wing 104. In certain aspects, the pressure sensor modules 110 may be placed at evenly distributed span-wise positions; however, exceptions may exist where, for example, the wing includes canted portions that present difficulty for sensor placement or portions of the leading edge that are aft of the propulsors 108, where the propulsor's 108 downwash could interfere with pressure measurements.

A cabling channel 112 may be provided lengthwise (the longitudinal length) along the surface of the wings 104 and/or horizontal stabilizer 106a to house the connections (e.g., cabling and/or tubing) between the plurality of pressure sensor modules 110 and to facilitate connection with a central controller (e.g., a processor), which may be positioned within the fuselage 102 (e.g., the avionics bay). To reduce drag and to provide protection to the cabling and tubing, the cabling channels 112 may be covered with a panel or fairing. The cabling channel 112 may be positioned on either the upper or the lower surface of the wing 104. While the fixed wing sUAS 100 is illustrated as having a fuselage 102, the present techniques may be applied to other aerial vehicles, such as a flying wing, which does not have a traditional fuselage.

While the fixed wing sUAS 100 is illustrated as having 10 pressure sensor modules 110 on each wing 104 (i.e., a total of 20 pressure sensor modules 110 on the primary wing set), additional or fewer pressure sensor modules 110 may be employed depending on the wingspan of the wing 104. Increasing the number of pressure sensor modules 110, for example, improves the estimate quality by weighting across all measurements from the plurality of pressure sensor modules 110 to reduce sensor noise. Likewise, while the horizontal stabilizer 106a is illustrated as having six pressure sensor modules 110 (i.e., 3 on each side of the vertical stabilizer 106b), additional or fewer pressure sensor modules 110 may be employed to provide better estimates.

In one aspect, each of the plurality of pressure sensor modules 110 may comprises a pressure sensor rib structure 300 (or other supporting structure), three or more pressure-sensing ports, and two or more differential pressure transducers 400. For example, each of the plurality of pressure sensor modules 110 may employ three pressure-sensing ports fluidly coupled to two differential pressure transducers 400: the first differential pressure transducer 400 measures the difference between the upper surface and leading edge, and the second differential pressure transducer 400 measures the difference between the lower surface and leading edge. While a pressure sensor rib structure 300 is illustrated, the structure that supports and/or defines the three or more pressure-sensing ports and the two or more differential pressure transducers may be configured in other formats and shapes.

The differential pressures may be calibrated and/or cross-referenced using a reference dataset to determine an estimation of changes in aerodynamic forces at each of the plurality of pressure sensor modules 110 along the leading edge of the wing 104. For example, calibration of pressure readings using wind tunnel data and/or flight test data allows for estimation of changes in aerodynamic forces (lift, drag, etc.) at each span-wise position. The reference dataset may be stored to a database of, for example, a memory device operatively or communicatively coupled with a processor. Moreover, estimates of total forces and moments acting on the aircraft can be determined from the known span-wise position of each of the plurality of pressure sensor modules 110. Therefore, each of the plurality of pressure sensor modules 110 may be positioned along the leading edge of the wing 104 at a predetermined position to enable estimation of total forces and moments acting on the aircraft. As noted, increasing the number of pressure sensor modules 110 along a given wing span improves the estimate quality by weighting across all measurements to reduce sensor noise.

A wing 104 with pressure sensor modules 110 offers a number of advantages. First, pressure-sensing ports can be placed in ribs during additive manufacturing process to facilitate integration with the wings 104. Second, ribs can define or otherwise form conduits (e.g., conduits 306a, 306b, 306c) and pressure sensor cavities (e.g., pressure sensor cavity 308) to fit miniaturized differential pressure transducers 400 in wing, rather than routing tubing through wing and taking up space in fuselage. Finally, measurements between pressure-sensing ports enable mapping to lift curves on wing, thereby enabling fusion with flight control system with minimal complexity. Moreover, the known span-wise position of each pressure sensor module 110 allows for estimates of total forces and moments acting on the aircraft.

In the case of two differential pressure sensor readings measuring differences in pressure between three taps near the leading edge of the wing, calibration to aerodynamic forces may result in planar calibration surfaces. Each pressure sensor module may have its own calibration surface to measure absolute lift in real time. As another approach, each pressure sensor module may use the same calibration surface to measure relative changes in lift in real time.

The fixed wing sUAS 100 may further comprise an avionics bay to house the various navigation and flight control systems, which control the various aircraft components and functions. The navigation and flight control systems may be communicatively coupled with an INS that is communicatively coupled with an inertial measurement unit and GPS receiver, an onboard data storage device (e.g., hard drive, flash memory, or the like), a wireless communication device, or virtually any other desired services. The GPS gives an absolute drift-free position value that can be used to reset the INS solution or can be blended with it by use of a mathematical algorithm, such as a Kalman Filter. The avionics bay may also house, or be operably coupled to, the payload.

A payload, which may be mounted to the fuselage 102, can include, for example, armament and/or an ISR surveillance payload used to collect data and/or monitor an area. For example, the fixed wing sUAS 100 may be equipped with one or more cameras, audio devices, and other sensors. Any video, or other data, collected by the fixed wing sUAS 100 may be communicated to a ground control station in real time wirelessly. The fixed wing sUAS 100 may be further equipped to store said video and data to a database of the onboard data storage device.

FIG. 2 displays a cross-section of a leading edge of an example wing airfoil 200 with the approximate location of pressure-sensing ports ($p_1$, $p_2$, $p_3$) indicated. As illustrated, an upper surface pressure-sensing port ($p_1$) is positioned adjacent the leading edge on the upper surface, a lower surface pressure-sensing port 310b ($p_2$) is positioned adjacent the leading edge on the lower surface, and a leading edge pressure-sensing port 310c ($p_3$) is positioned at the leading edge. The upper surface pressure-sensing port ($p_1$) and the lower surface pressure-sensing port 310b ($p_2$) may be positioned at a predetermined chord distance from the leading edge. The chord distance may be, for example, 10-20%, more preferably 5-15%, most preferably 1-10% from the leading edge, depending on airfoil thickness. That is, the closer to the leading edge, the greater the resolution in readings.

When a thin airfoil is used (e.g., an AG35 airfoil, which has a max thickness ratio of 0.087), however, the location of the differential pressure transducer can be restricted from locations that are too close to the leading edge due to manufacturing practicality. Therefore, in such thin airfoils, the pressure-sensing ports may be, for example, at closest 7.5% chord lengths from the leading edge.

Figure 9:
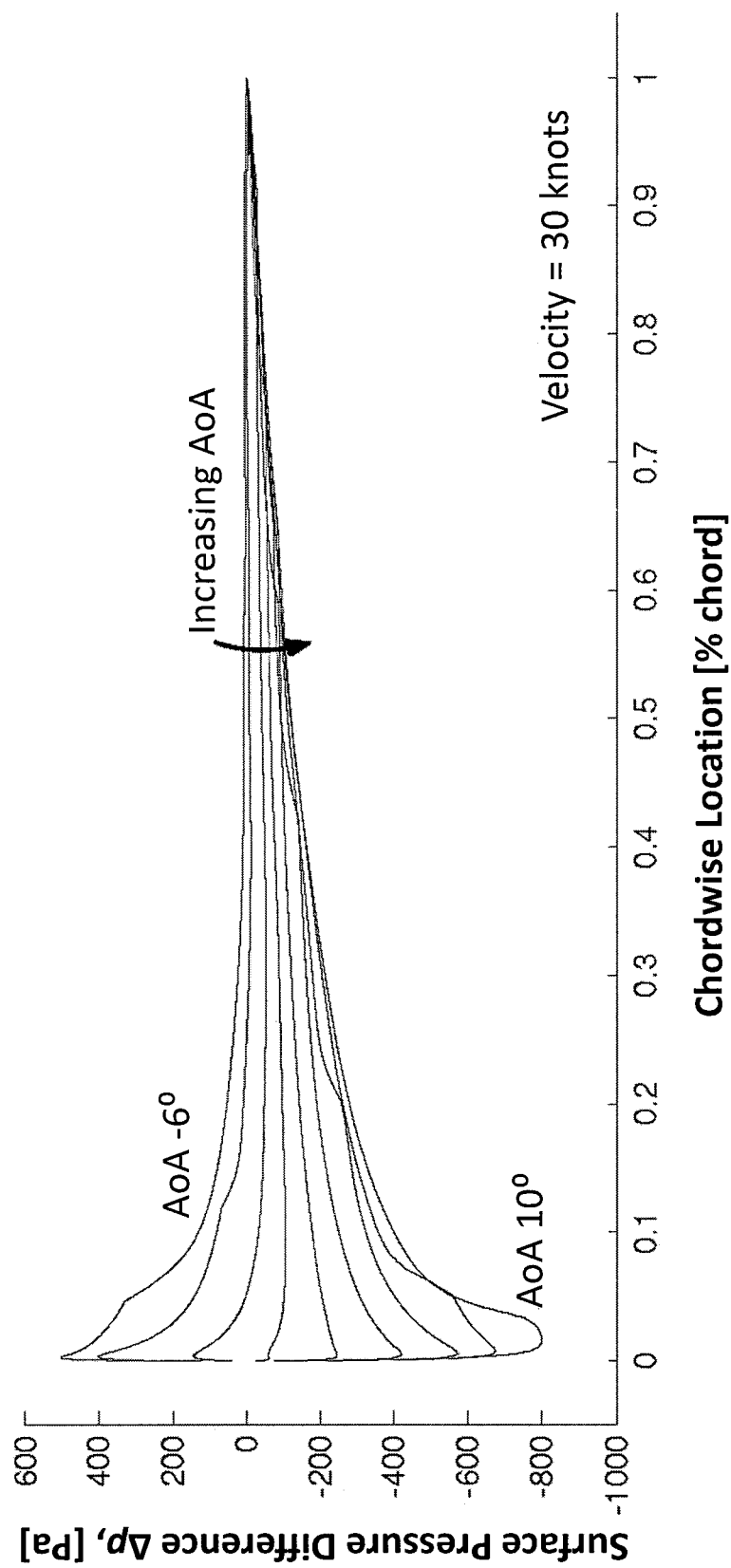
FIG. 9 is a graph demonstrating the chord wise location of the pressure ports' effect on pressure changes between different angles of attack.

The location of the differential pressure transducer can also affect the accuracy requirements of the differential pressure transducer because particular surface locations are more sensitive to changes in aerodynamic forces. For example, changes in angles of attack result in changes in the differential pressure between the upper and lower airfoil surfaces. As demonstrated by the data of FIG. 9, measurements taken closer to the leading edge results in larger changes in pressure between different angles of attack. Locating the differential pressure taps close to the leading edge therefore results in better resolution for the sensor module.

Figure 3A:
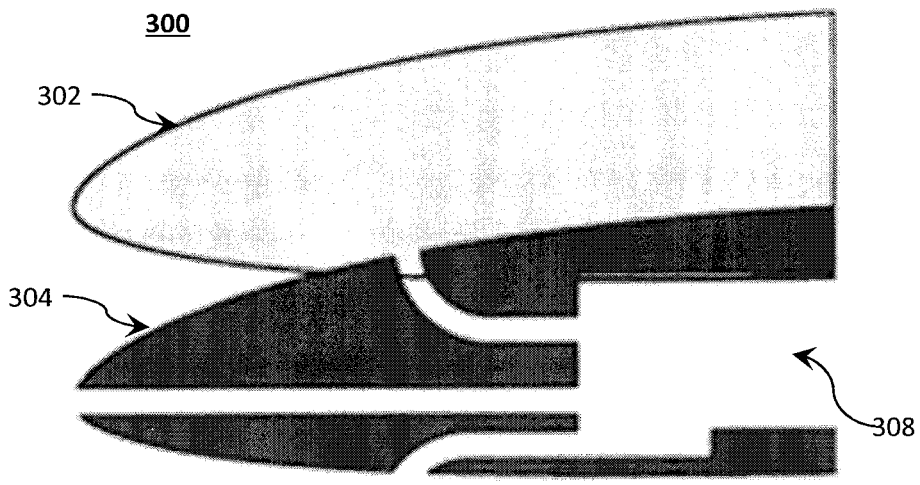
FIGS. 3a through 3c illustrate an example pressure sensor rib structure.
Figure 3B:
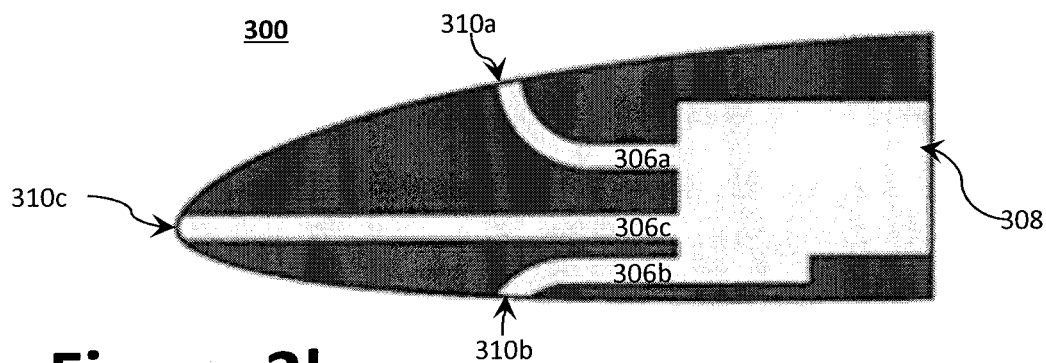
Figure 3C:
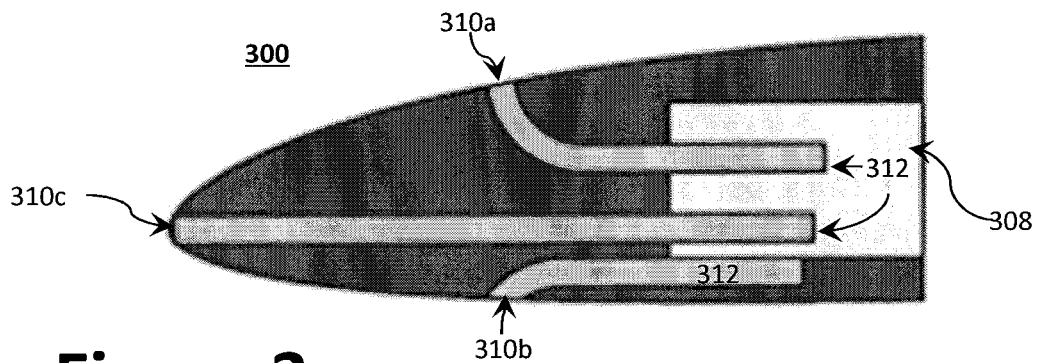

FIGS. 3a through 3c illustrate an example pressure sensor rib structure 300 of a pressure sensor module 110. As illustrated, the outer profile of the pressure sensor rib structure 300 defines a plurality of pressure-sensing ports 310a, 310b, and 310c. The plurality of pressure-sensing ports 310a, 310b, and 310c includes the upper surface pressure-sensing port 310a ($p_1$), the lower surface pressure-sensing port 310b ($p_2$), and the leading edge pressure-sensing port 310c ($p_3$). As illustrated, the outer profile of the pressure sensor rib structure 300 may be sized and shaped to match the profile of the leading edge of the wing 104 or horizontal stabilizer 106a. For example, the pressure sensor module 110 may be embedded into a primary wing with a constant AG35 airfoil profile.

The pressure sensor rib structure 300 may be fabricated with one or more backing plates 302 and a channel guide plate 304 (e.g., a backing plate 302 may be positioned on one or both sides of the channel guide plate 304). The channel guide plate 304 defines a differential pressure transducer cavity 308 and at least three conduits 306a, 306b, 306c. The three conduits 306a, 306b, 306c include an upper surface conduit 306a, a lower surface conduit 306b, and a leading edge conduit 306c. The upper surface conduit 306a provides for fluid communication between the differential pressure transducer 400 (via the differential pressure transducer cavity 308) and the upper surface pressure-sensing port 310a, while the lower surface conduit 306b and the leading edge conduit 306c provide for fluid communication between the differential pressure transducer 400 and the lower surface pressure-sensing port 310b or the leading edge pressure-sensing port 310c, respectively. In certain aspects, such as situations where the channel guide plate 304 is fabricated from a porous or non-rigid material that could affect pressure readings, a rigid conduit 312 may be inserted into each of said three conduits 306a, 306b, 306c that extends from the differential pressure transducer 400 to the outer surface of the pressure sensor rib structure 300. The rigid conduit 312 reinforces the conduits 306a, 306b, 306c and ensures an airtight pathway from the pressure-sensing port to the differential pressure transducer 400. The rigid conduit 312 may be fabricated from, for example, metal (including metal alloys) or a plastic/resin material.

The pressure sensor rib structure 300 may be fabricated from wood, a composite material, resin, metal, and the like. The pressure sensor rib structure 300 may be fabricated from multiple components as illustrated in FIGS. 3a through 3c, or printed as a single component using three-dimensional printing techniques. For example, the channel guide plate 304 may be integral with one or more backing plates 302. That is, the pressure sensor rib structure 300 may be printed using three-dimensional printing techniques where the hypodermic tubing is printed directly into the ribs. In certain aspects, the pressure sensor rib structure 300 may be fabricated as part of the wing 104. For example, the pressure-sensing ports 310a, 310b, and 310c and/or three conduits 306a, 306b, 306c may be formed in the leading edge of a wing during fabrication of the wing as part of, for example, an additive manufacturing process. In certain aspects, the pressure sensor rib structure 300 may be heated to mitigate ice formation, which could clog one or more of the three conduits 306a, 306b, 306c. For example, if a metal rigid conduit 312 is employed, a low current may be applied to the metal rigid conduit 312 to generate heat. Alternatively, heat-generating conductors may be embedded along the three conduits 306a, 306b, 306c.

Differential pressure transducers 400 are fluidly coupled to each of three conduits 306a, 306b, 306c (or rigid conduits 312, where applicable) and used to sense pressure differences between the upper, lower, and/or leading surfaces of the wing 104, and thus, determine the metrics of interest (e.g. angle of attack and lift coefficient) for gust rejection. To that end, a first differential pressure transducer may be fluidly coupled to the upper surface conduit 306a and the leading edge conduit 306c, while a second differential pressure transducer may be fluidly coupled to the lower surface conduit 306b and the leading edge conduit 306c. A benefit of using differential pressure transducers is that it avoids comparing small pressure changes on the airfoil surface to absolute pressure readings (i.e., trying to detect small changes in large numbers).

There are two considerations when selecting a differential pressure transducer for the pressure sensor rib structure 300. A first consideration is the accuracy of the main metrics (i.e., angle of attack and lift coefficient), which drives the differential pressure transducer accuracy requirement. A second consideration is the location of the differential pressure transducers, which drives the pressure range specification. That is, the closer the pressure-sensing ports 310a, 310b, and 310c are to the leading edge of the wing 104, the greater the signal. To identify the requirements in differential pressure transducer accuracy, one should determine the accuracy of the metrics like angle of attack and lift coefficient. For a given differential pressure transducer accuracy at a specific chord wise location, the resolution of angle attack could be determined from the surface pressure distribution. Further, the resolution of the angle of attack could be used to infer the resolution in lift coefficient from the AG35 lift curve. The AG35 lift curve could be approximated by a linear fit. A suitable differential pressure transducer for the pressure sensor module 110 includes was the All Sensor DLVR-L02D-E1NJ J Lead SMT, which has a sensing range of ±2 in $H_2O$ and an accuracy of ±1.5% of 2 in $H_2O$. These specifications accommodate the needs determined by the AG35 airfoil analysis.

The differential pressure transducers 400, an example of which is illustrated in FIGS. 4a and 4b, can be mounted to a printed circuit board (PCB) positioned in or near the differential pressure transducer cavity 308. As illustrated, each differential pressure transducer 400 includes two connection ports 402, which fluidly couple to two of said three pressure-sensing ports 310a, 310b, and 310c. The differential pressure transducers 400 may be wired to a bus (e.g., a shared Inter Integrated Circuit (I2C) bus) via pins 404, and fed into a processor 406 (e.g., an Arduino MEGA microcontroller) that is communicatively coupled with a memory device 408.

The bus cable (e.g., a I2C bus cable) may be bound and secured to the wing 104 within cabling channel 112 to the fuselage 102, branching off at each span-wise position to connect to the differential pressure transducers 400 of a pressure sensor module 110. The cabling may be a 4 circuit ribbon cable split into a Y geometry for each differential pressure transducer 400 connection. To ensure a quality signal traverses the entire length of the I2C bus cable, a pull up resistor may be soldered between the Vcc (power) and serial data line (SDA) (data signal) lines on the bus. To reduce the crosstalk between clock and data, the I2C bus cable may have the wires oriented by |Clk|Gnd|Power|Data|. However, other arrangements are possible, such as |Gnd|Power|Data|Clk|. The power may be, for example, 3.3V.

The output from the differential pressure transducers 400 may be integrated with an autopilot to log data and report real-time readings to a ground control station. Sensors may be read using a microcontroller unit board (e.g., a STM Nucleo board), which can parse the data into a desire communication format (e.g., MAVLink message packet), which may then passed in a MAVLink message to the PX4 FMU for logging. That is, feedback of the differential pressure measurements from the differential pressure transducers 400 may be taken to replace, or supplement, existing roll torque estimation techniques for disturbance rejection on sUAS. Two approaches may be used in conjunction with the distributed pressure sensor system to estimate the lift on each wing and, consequently, roll torque.

A first approach employs the differential pressure measurements between the top and bottom of the airfoil ($\Delta p_L = p_1 - p_2$) and the leading edge and the top of the airfoil ($\Delta p_\alpha = p_1 - p_3$) to estimate angle of attack ($\alpha$) and freestream velocity (V). An overall estimate of lift in accordance with this approach may be determined using Equation 1, where L is lift, $\rho$ is air density at sea level, S is the planform area of the wing, and $C_L$ (=$C_L(\alpha)$) is the coefficient of lift for the wing. The differential pressure data may be used to estimate the lift on each wing. To calculate lift, the differential pressure readings may be used to estimate freestream velocity (V) and angle of attack ($\alpha$), which can then be used in Equation 1.

While the differential pressure is described above as being determined between specific sets of pressure-sensing ports (i.e., $\Delta p_L = p_1 - p_2$, and $\Delta p_\alpha = p_1 - p_3$), other sets of pressure-sensing ports may be used to determine differential pressures. In certain aspects, for example, $\Delta p_L$ may be the differential pressure measurement between the bottom ($p_2$) and leading edge ($p_3$) of the airfoil (i.e., $\Delta p_L = p_2 - p_3$), while $\Delta p_\alpha$ may be the differential pressure measurement between the top ($p_1$) and leading edge ($p_3$) of the airfoil (i.e., $\Delta p_\alpha = p_1 - p_3$). Therefore, in view of the subject disclosure, a person of ordinary skill in the art would appreciate that the set or sets of pressure-sensing ports for determining differential pressure may be selected to meet a particular need, which may be guided by the aircraft of airfoil type or shape. For instance, the research performed in the wind tunnel, described with regard to FIGS. 8a and 8b, used differential pressure measurement between the top ($p_1$) and the leading edge ($p_3$), and the differential pressure measurement between the bottom ($p_2$) and the leading edge ($p_3$). Specifically, FIGS. 8a and 8b illustrate, respectively, example lift and rolling moment mapping to the lower and upper surface pressure from the steady state wing characterization, where the sensor location 1 (closest to the wing root), 0 degree aileron deflection.

$$L = \tfrac{1}{2} \rho V^2 S C_L \qquad \text{Equation 1}$$

Roll torque may then be estimated using the difference in lift between the left and right wings. As can be appreciated, the left and right wings are positioned on opposite sides of the fuselage (where applicable) or, in other words, on opposite sides of the aircraft's center of gravity. Through computational fluid dynamics (CFD) modeling, the first approach was substantiated using Equations 2 through 5.

$$\text{Velocity}(V_{right}) = \sqrt{(u - r^*a)^2 + v^2 + (w + p^*a)^2} \qquad \text{Equation 2}$$

$$\text{Angle of Attack}(\alpha_{right}) = \tan^{-1} w - p^*a/u - r^*a \qquad \text{Equation 3}$$

$$\text{Velocity}(V_{left}) = \sqrt{(u + r^*a)^2 + v^2 + (-p^*a)^2} \qquad \text{Equation 4}$$

$$\text{Angle of Attack}(\alpha_{left}) = \tan^{-1} w - p^*a/u + r^*a \qquad \text{Equation 5}$$

Equations 2 through 5 assume that the wing extends along the body frame y-axis. The variable "a" refers to the location of the pressure measurements along the y-axis. For purposes of the CFD modeling, this distance was chosen to be 0.5 meter, which is the furthest location where freestream velocity (V) and angle of attack ($\alpha$) conditions stay within the ranges of conditions of data acquired for the tested airfoil (i.e., AG35). At this distance, the roll moment has a greater effect on the conditions experienced by the pressure sensor.

Figure 5:
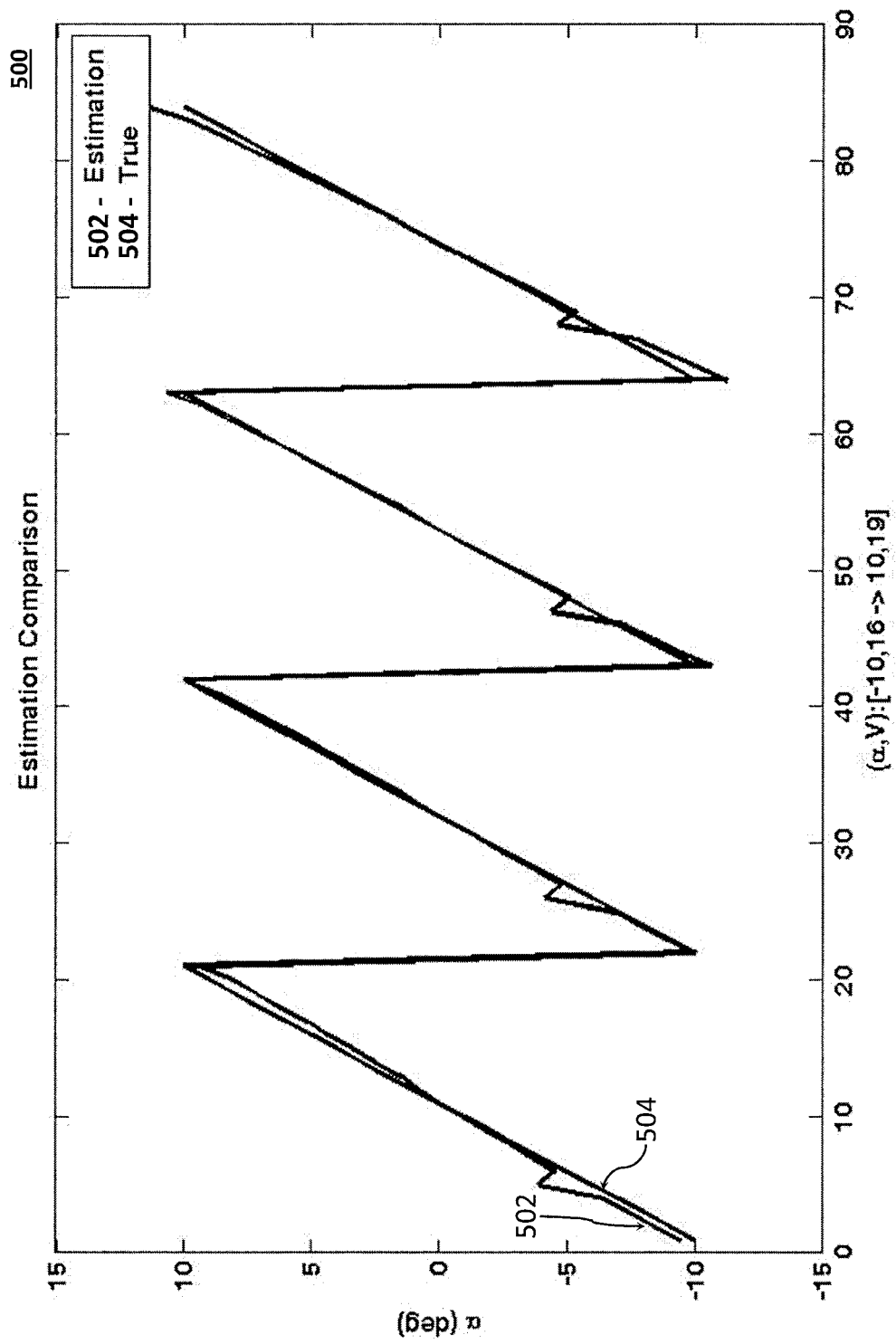
FIG. 5 is a graph depicting a comparison of estimated and actual angles of attack.
Figure 6:
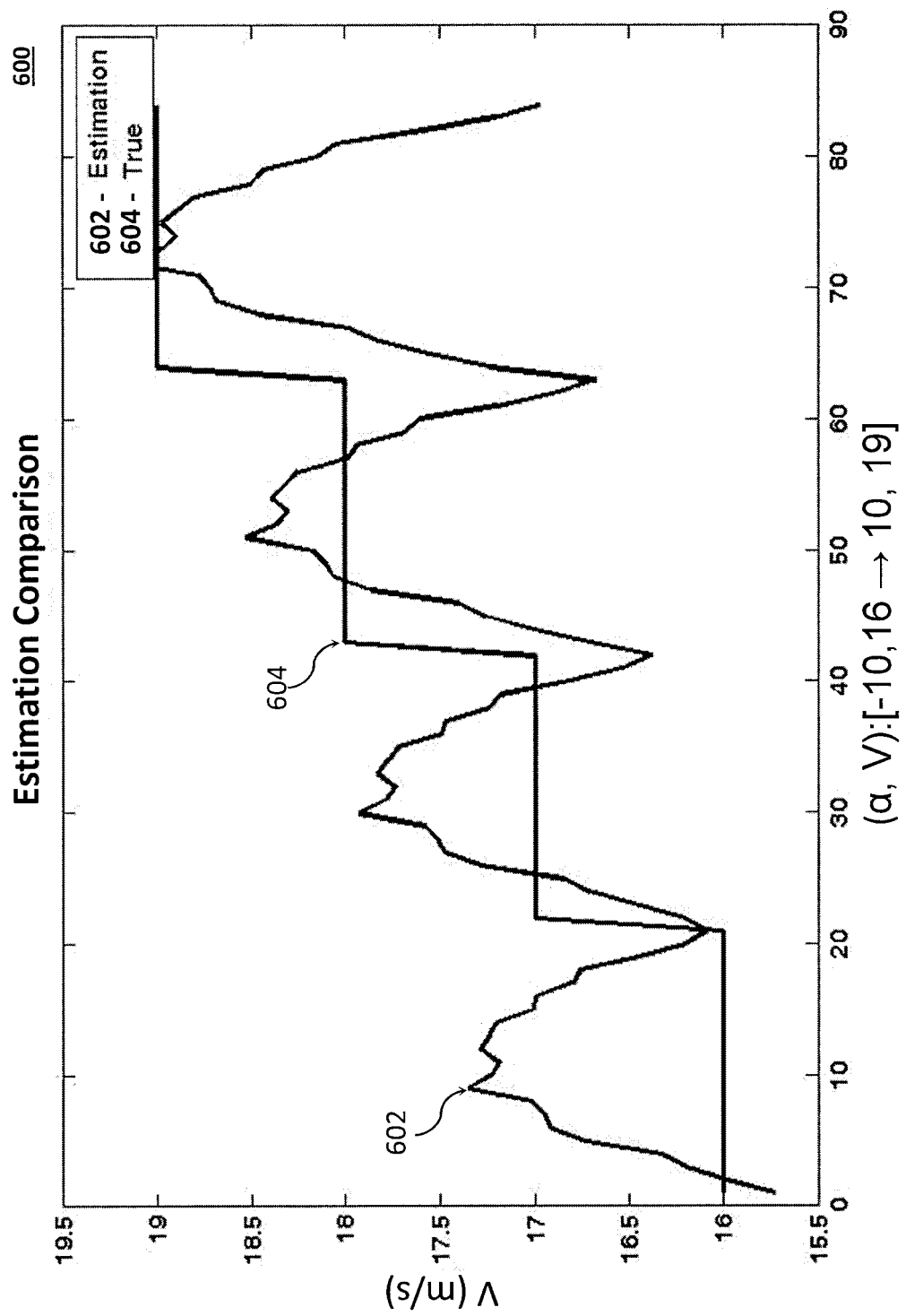
FIG. 6 is a graph depicting a comparison of estimated and actual wind speeds.

The differential pressure readings were found to estimate accurately the angle of attack ($\alpha$), the results 500 of which are shown in FIG. 5. As depicted, the estimated angle of attack ($\alpha$) substantially align with the actual angle of attack ($\alpha$). The differential pressure readings, however, were less accurate in terms of estimating freestream velocity (V), the results 600 of which are shown in FIG. 6. Accordingly, freestream velocity (V) could not be predicted with sufficient accuracy using only the differential pressure readings.

Since the freestream velocity (V) could not be predicted with sufficient accuracy using the first approach, a second approach was evaluated that employs a numerically based static estimators for roll torque using the differential pressure measurements ($\Delta p_L$ and/or $\Delta p_\alpha$). The numerically based static estimators are favored for roll torque using one or both of the differential pressure measurements.

The full static roll torque estimator is a function of the difference between the two differential pressures ($\Delta p_L$ and $\Delta p_\alpha$) on each wing (left and right). The resulting full static roll torque estimation equation for this approach is provided in Equation 6.

$$\text{Roll Torque} = (\Delta p_{L_{right}} - \Delta p_{L_{left}})(-1.23 * 10^{-5}) + (\Delta p_{\alpha_{right}} - \Delta p_{\alpha_{left}})(2.88 * 10^{-4}) \qquad \text{Equation 6}$$

Figure 7:
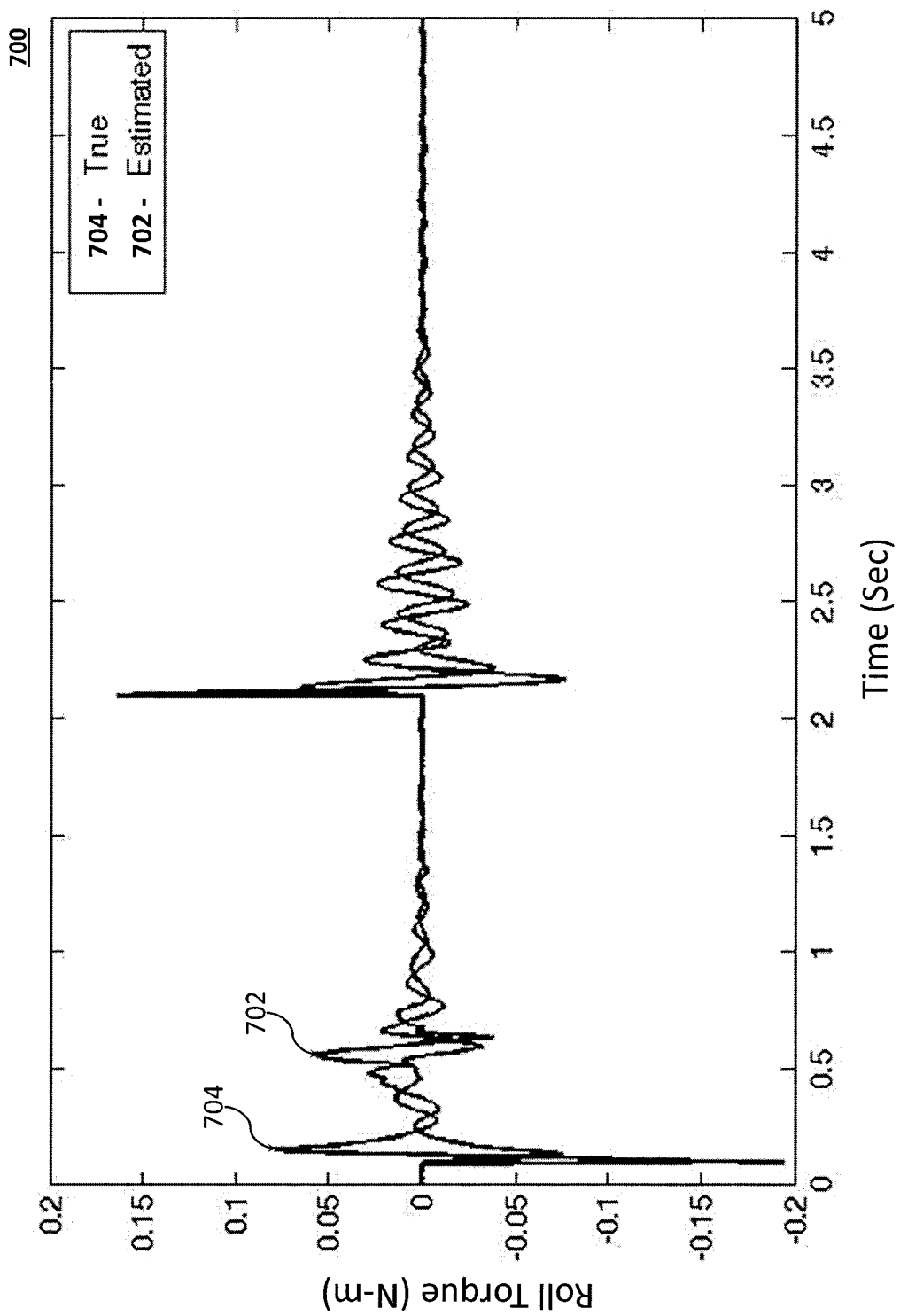
FIG. 7 is a graph depicting a comparison of estimated and actual roll torque.

Applying Equation 6, a finite step input disturbance (from 0.1 seconds to 2.1 seconds) in the roll rate state was then introduced into the CFD simulation and the resulting roll torque and estimated roll torque were plotted as a function of time in the graph 700 of FIG. 7. The results of the simulation demonstrate that the added fidelity for the differential pressure based torque feedback (applying realistic aerodynamics and sensor delay) does not significantly reduce closed loop performance as compared to the idealized case.

Where only a single pressure differential is practicable, a reduced static roll torque estimator may be employed that uses only the top and bottom pressure differential value ($\Delta p_L$). The reduced static roll torque estimator equation is provided in Equation 7.

$$\text{Roll Torque} = (\Delta p_{L_{right}} - \Delta p_{L_{left}})(-1.23 * 10^{-5}) \qquad \text{Equation 7}$$

While both versions of the static roll torque estimator (Equations 6 and 7) are suitable, closed loop results were evaluated for each and the results demonstrated a noticeable improvement in closed loop performance when both pressure differential terms are included in the estimator (i.e., Equation 6). Accordingly, use of three pressure-sensing ports (e.g., pressure-sensing ports 310a, 310b, and 310c) demonstrates improved accuracy over two pressure-sensing ports.

A wing design with two pressure-sensing ports on the top and bottom surface of the wing (e.g., pressure-sensing ports 310a and 310b) at 10% chord, alone may not be sufficient to disambiguate local changes in airflow. For example, consider a wing with a local Reynolds number change on a section of the wing (i.e., the magnitude of the velocity differs from the freestream, but not the angle). Now consider an identical wing but with a local angle of attack change instead. In this scenario, it is possible for both wings to measure the same differential pressure at the 10% chord location and produce different lifts. To resolve this issue, additional information would be necessary to distinguish between local Reynolds number changes and local angle of attack changes. A solution, however, would include local total pressure measurements for each span-wise position. This allows the differential surface pressure to be non-dimensionalized by the local dynamic pressures (using the local total pressure and either surface static pressure), which will reduce the effect of Reynolds number changes on the measurements. This additional information differentiates the effect of Reynolds number changes and the effect of angle of attack changes.

The pressure sensor module, as described herein, may be coupled with operations of various flight control surfaces. The measurements identified by the plurality of pressure sensor modules 110 may be utilized to adjust the control surfaces accordingly. Such ability to adjust the control surfaces based on the pressure sensor module measurements increases the maneuverability of an aircraft and enables an aircraft to be more versatile in responding to certain disturbances an aircraft may encounter. In certain aspects, implementing the pressure sensor module 110 provides an ability to detect pressure changes surrounding the airfoil, thus enabling an aircraft to quickly detect and counter changes in lift, onset of stall, and flutter. Non-limiting examples of the control surfaces are flaps, slats, spoilers, rudders, elevators, and the like.

In some embodiments, one or a group of pressure sensor modules may be placed on or around each of the control surfaces. In this embodiment, the control surfaces may be manipulated based on the measurements acquired by the one or a group of pressure sensor modules placed on each of the control surfaces. The control surfaces may be assigned with one or a group of pressure sensor modules such that the control surfaces can be individually controlled based on the corresponding pressure sensor modules' measurements. With more control surfaces installed on an aircraft, minor adjustment can be made to an aircraft's flight control. In some embodiments, the pressure sensor modules 110 may be coupled with or in communication with the control system of the control surfaces. A threshold value or a range of values may be assigned to an expected pressure values in order to automatically operate the control surfaces. The control surface may be controlled or change its orientation by comparing the expected pressure value and the actual pressure value or pressure differences measured by the pressure sensor module. In some embodiments, the pressure sensor modules 110 may be placed on wings in a distributed fashion. Each of the pressure sensor modules may be strategically placed to identify a profile of the differential pressure measurements along the span of the control surface. The identified profile may be compared against a model differential pressure profile. Based on which, the control surfaces may be manipulated to adjust the identified profile to closely match the model differential pressure profile.

The above-cited patents and patent publications are hereby incorporated by reference in their entirety. Although various embodiments have been described with reference to a particular arrangement of parts, features, and like, these are not intended to exhaust all possible arrangements or features, and indeed many other embodiments, modifications, and variations can be ascertainable to those of skill in the art. Thus, it is to be understood that the invention may therefore be practiced otherwise than as specifically described above.

What is claimed is:

1. A distributed pressure sensor system for an aerial vehicle, the distributed pressure sensor system comprising: a first wing and a second wing, each of said first wing and said second wing having an upper surface, a lower surface, a leading edge, and a trailing edge; and a first plurality of pressure sensor modules distributed along the leading edge of the first wing, and a second plurality of pressure sensor modules distributed along the leading edge of the second wing, wherein each of said first and second pluralities of pressure sensor modules comprises an upper surface pressure-sensing port, a lower surface pressure-sensing port, a leading edge pressure-sensing port, a first differential pressure transducer, and a second differential pressure transducer, wherein the upper surface pressure-sensing port is positioned on the upper surface adjacent the leading edge, wherein the leading edge pressure-sensing port is positioned at the leading edge, wherein the lower surface pressure-sensing port is positioned on the lower surface adjacent the leading edge, wherein the first differential pressure transducer is fluidly coupled to two of said upper surface pressure-sensing port, said lower surface pressure-sensing port, and said leading edge pressure-sensing port to determine a first differential pressure, and wherein the second differential pressure transducer is fluidly coupled to two of said upper surface pressure-sensing port, said lower surface pressure-sensing port, and said leading edge pressure-sensing port to determine a second differential pressure that is different from said first differential pressure.

2. The distributed pressure sensor system of claim 1, wherein each of the first wing and the second wing comprises a composite material.

3. The distributed pressure sensor system of claim 1, wherein the first differential pressure transducer and the second differential pressure transducer are operatively coupled with a processor via an Inter Integrated Circuit (I2C) bus cable.

4. The distributed pressure sensor system of claim 3, further comprising a cabling channel running lengthwise adjacent the leading edge of said first wing and said second wing.

5. The distributed pressure sensor system of claim 4, wherein the I2C bus cable is positioned within said cabling channel.

6. The distributed pressure sensor system of claim 3, wherein the I2C bus cable comprises conductors oriented by |Clk|Gnd|Power|Data|.

7. The distributed pressure sensor system of claim 1, wherein each of said first and second pluralities of pressure modules includes a pressure sensor rib structure.

8. The distributed pressure sensor system of claim 7, wherein an outer profile of the pressure sensor rib structure is sized and shaped to match a profile of at least a portion of the leading edge.

9. The distributed pressure sensor system of claim 7, wherein the pressure sensor rib structure defines an upper surface conduit, a lower surface conduit, and a leading edge conduit.

10. The distributed pressure sensor system of claim 9, wherein the first differential pressure transducer is fluidly coupled to the upper surface pressure-sensing port via the upper surface conduit and to the leading edge pressure-sensing port via the leading edge conduit, and wherein the second differential pressure transducer is fluidly coupled to the lower surface pressure-sensing port via the lower surface conduit and to the upper surface pressure-sensing port via the upper surface conduit.

11. The distributed pressure sensor system of claim 9, wherein the pressure sensor rib structure defines a differential pressure transducer cavity to house the first differential pressure transducer and the second differential pressure transducer.

12. The distributed pressure sensor system of claim 1, further comprising a processor operably coupled with the first differential pressure transducer and the second differential pressure transducer, wherein the processor is configured to calculate lift on each of the first wing and the second wing based on the first differential pressure and the second differential pressure.

13. The distributed pressure sensor system of claim 1, further comprising a processor operably coupled with the first differential pressure transducer and the second differential pressure transducer, wherein the processor is configured to calculate a calculated roll torque of the aerial vehicle based on the first differential pressure and the second differential pressure.

14. The distributed pressure sensor system of claim 13, wherein the processor is operably coupled with an autopilot.

15. The distributed pressure sensor system of claim 14, wherein the processor is configured to instruct the autopilot based at least in part on the calculated roll torque.

16. The distributed pressure sensor system of claim 1, wherein each of the lower surface pressure-sensing port, the upper surface pressure-sensing port, and the leading edge pressure-sensing port is formed in the leading edge of the first wing or the second wing as part of an additive manufacturing process.

17. A method for determining roll torque of an aircraft using a distributed pressure sensor system having a plurality of pressure sensor modules distributed along a leading edge of a wingset comprising a first wing and a second wing, the method comprising: measuring, via a first differential pressure transducer at a first pressure sensor module, a first differential pressure between a first set of pressure-sensing ports positioned on the first wing; measuring, via a second differential pressure transducer at the first pressure sensor module, a second differential pressure between a second set of pressure-sensing ports positioned on the first wing; determining lift, via a processor, on said first wing using said first differential pressure and said second differential pressure; measuring, via a third differential pressure transducer at a second pressure sensor module, a third differential pressure between a third set of pressure-sensing ports positioned on the second wing, the first wing and the second wing being positioned on opposite sides of a center of gravity of the aircraft; measuring, via a fourth differential pressure transducer at the second pressure sensor module, a fourth differential pressure between a fourth set of pressure-sensing ports positioned on the second wing; determining, via the processor, lift on said second wing using said third differential pressure and said fourth differential pressure; and calculating, via the processor, a roll torque of the aircraft as a function of a difference between lift on said first wing and lift on said second wing.

18. The method of determining roll torque of claim 17, further comprising the step of calibrating the first, second, third, and fourth differential pressure using a reference dataset to determine an estimation of changes in aerodynamic forces at each of said plurality of pressure sensor modules along the leading edge of the wingset, wherein the reference dataset is stored to a memory device communicatively coupled with the processor.

19. The method for determining roll torque of claim 18, wherein the reference dataset includes wind tunnel data or flight test data.

20. The method for determining roll torque of claim 19, wherein each of said plurality of pressure sensor modules is positioned along the leading edge of the wingset at a predetermined position to enable estimation of total forces and moments acting on the aircraft.

* * * * *